(12) United States Patent
Wu

(10) Patent No.: US 7,280,304 B2
(45) Date of Patent: Oct. 9, 2007

(54) METHOD AND CIRCUIT FOR COMPENSATING SLOW-VARYING RUNOUT OF DISK STORAGE SYSTEM

(75) Inventor: Sheng-Hung Wu, Hsinchu (TW)

(73) Assignee: Cheertek Inc., Hsinchu (TW)

( * ) Notice: Subject to any disclaimer, the term of this patent is extended or adjusted under 35 U.S.C. 154(b) by 0 days.

(21) Appl. No.: 11/164,136

(22) Filed: Nov. 11, 2005

(65) Prior Publication Data

US 2007/0053097 A1    Mar. 8, 2007

(30) Foreign Application Priority Data

Sep. 6, 2005    (TW) .............................. 94130484 A

(51) Int. Cl.
G11B 21/02    (2006.01)
(52) U.S. Cl. ...................................................... 360/75
(58) Field of Classification Search ..................... None
See application file for complete search history.

(56) References Cited

U.S. PATENT DOCUMENTS

| | | | |
|---|---|---|---|
| 4,536,809 A * | 8/1985 | Sidman ................... | 360/77.04 |
| 6,088,186 A | 7/2000 | Carlson ................... | 360/77.04 |
| 6,493,175 B1 | 12/2002 | Carlson ................... | 360/78.04 |
| 6,510,017 B1 | 1/2003 | Abdelnour ................ | 360/77.04 |
| 6,545,835 B1 | 4/2003 | Codilian et al. .......... | 360/77.04 |
| 6,549,362 B1 | 4/2003 | Melrose et al. ........... | 360/77.04 |
| 6,747,836 B2 * | 6/2004 | Stevens et al. ........... | 360/78.05 |
| 6,768,705 B2 | 7/2004 | Hirai ....................... | 369/44.28 |
| 6,831,803 B2 | 12/2004 | Hsin ....................... | 360/77.04 |
| 6,865,142 B2 | 3/2005 | Eytan et al. ............. | 369/44.29 |

* cited by examiner

*Primary Examiner*—K. Wong
(74) *Attorney, Agent, or Firm*—Jianq Chyun IP Office

(57) ABSTRACT

A method and a circuit for compensating a slow-varying runout of a disk storage system are provided. First, generate a basic runout compensation signal (BRC signal) and according to a position signal extracted from the pickup head output generate a runout error signal (RE signal). Afterwards, when corresponding to a predetermined phase of the BRC signal, the RE signal is compared with a first predetermined error tolerance range (first PETR) and according to the comparison result it is decided whether the BRC phase needs to be adjusted; or/and when corresponding to a predetermined position of the BRC signal, the RE signal is compared with a second predetermined error tolerance range (second PETR) and according to the comparison result it is decided whether the BRC amplitude needs to be adjusted. Finally, a runout compensation signal obtained by adjusting the BRC signal is used for adjusting the pickup head position.

19 Claims, 6 Drawing Sheets

METHOD AND CIRCUIT FOR COMPENSATING SLOW-VARYING RUNOUT OF DISK STORAGE SYSTEM

CROSS-REFERENCE TO RELATED APPLICATION

This application claims the priority benefit of Taiwan application serial no. 94130484, filed on Sep. 6, 2005. All disclosure of the Taiwan application is incorporated herein by reference.

BACKGROUND OF THE INVENTION

1. Field of Invention

The present invention relates to a compensation method and circuit to enable the pickup head position of a disk storage system to displace, and particularly to a method and a circuit for compensating slow-varying runout of a disk storage system.

2. Description of the Related Art

The so-called "disk storage system" means a data storage system using circle disks as data storage media, where circle tracks are available for storing data. To properly write data into the tracks or read data from the tracks, precisely positioning of the pickup head for reading and writing data is essential.

To have the pickup head precisely positioned, any unstable state during spin of a disk must be considered. As shown in FIG. 1, a rotatory motor 100 is used for driving a disk 110 to spin, a pickup head 120 can vertically and laterally move by means of a positioning server 130 for aligning the data tracks. However, a disk runout during the spin thereof is likely to happen due to the disk error itself or a design error of the magnetic disk drive. Referring to FIG. 2A, a diagram shows a runout of a disk storage system during the spin thereof. The center of a disk 200 locates at a position 210 shown in FIG. 2A and circle data tracks 220 are distributed around the disk center. When the disk 200 is placed in the disk drive for writing or reading data, due to a non-coincidence between the turning center and the disk center, the disk 200 may spin around the turning center 215, instead of the desired disk center. Therefore, during the spin the data tracks 220 will displace, for example, taking a position of the dot-line circle 225 at a time shown in FIG. 2A. In other words, the running paths of the data track 220 are more like a hula hoop, rather than a desired and fixed circle. Another kind of runout is an axial runout as shown in FIG. 2B. Different from the above-described radial runout, the axial runout is due to a warp of the disk 200, which causes the disk to vibrate up and down during spinning.

To resolve the above-described runout problem, several resolutions have been provided. U.S. Pat. No. 6,088,186 provides a feedback control system and a circuit with a high-gain at the runout frequency to compensate the runout error. We note that the scheme is valid only in a condition with a stable rotate speed of the disk; hence, it works for a magnetic hard disk drive only where rotate speed of the disk is relatively stable, but not for an optical disk drive or a magnetic-optical disk drive.

In addition, a so-called "feed-forward control system" for compensating the runout is provided by, for example, U.S. Pat. Nos. 6,831,803, 6,549,362 and 6,545,835. According to the scheme provided by those patents, the errors caused by the online runouts are recorded, which are taken out for the disk storage system to compensate the runouts at some certain different spin positions. It can be seen that the scheme is suitable for those disk storage systems which do not require changing disks frequently, such as a magnetic hard disk drive. For a disk storage system requiring frequent changes of disks, for example, an optical disk drive, however, the scheme hereinabove is not adoptable. Since each disk has different runout and the recorded error corresponding to the runout of the last disk just drawn out is not the same as the present disk just put in the tray of an optical disk drive, the recorded runout control is not workable in this aspect.

SUMMARY OF THE INVENTION

Based on the above described, an object of the present invention is to provide a method for compensating the slow-varying runout of a disk storage system, wherein some simple comparisons and computations are used to generate an appropriate compensation on the disk storage system with slow-varying rotate speeds.

Another object of the present invention is to provide a circuit for compensating the slow-varying runout of a disk storage system, wherein no memory device is needed to record the slow-varying runout; instead, a feed-forward control system is employed to provide an appropriate compensation.

According to the above described, the present invention provides a method for compensating the slow-varying runout of a disk storage system. Wherein, first, a basic runout compensation signal (BRC signal) and a runout error signal (RE signal) corresponding to the position signal sensed by a pickup head are generated. Next, the phase-difference and the amplitude-difference between the BRC signal and the RE signal are obtained by signal comparison and according to the comparison result it is decided whether an adjustment of the phase and the amplitude of the BRC signal is needed. Finally, a runout compensation signal (RC signal) obtained by adjusting the BRC signal is output for adjusting the pickup head position.

In an embodiment of the present invention, to decide whether a phase adjustment of the BRC signal is needed, a comparison between the RE signal and a predetermined error tolerance range is conducted at a predetermined phase of the BRC signal. Wherein, the predetermined phase is 0° or 180°. The phase adjustment of the BRC signal can be reached either by forward shifting and backward shifting the BRC signal or by modifying the frequency of the BRC signal.

In an embodiment of the present invention, to decide whether an amplitude adjustment of the BRC signal is needed, the comparison between the RE signal at a time point corresponding to another predetermined phase of the BRC signal and a predetermined error tolerance range is conducted. If the RE signal value at the time point is within the predetermined error tolerance range, the amplitude adjustment of the BRC signal is not needed. If the RE signal value at the time point is beyond the predetermined error tolerance range, the BRC signal amplitude needs to be adjusted for reaching a result RE signal near to zero by the amplitude compensation. Noticeably, to conduct a right compensation, in-phase or in-inverse-phase relationship between the RE signal and the BRC signal must be considered herein. Besides, the above-described another predetermined phase of the BRC signal can be 90° or 270°.

The present invention also provides a circuit for compensating the slow-varying runout of a disk storage system. The circuit is suitable for any disk storage system using a disk as medium for storing data. The disk storage system employs a pickup head for reading data from a disk or writing data into a disk, and the position signal of the pickup head can be output. The circuit for compensating the slow-varying runout of a disk storage system includes a computation device, a filter, a waveform generator, an amplifier, a phase-difference detector, an amplitude-difference detector, a controller and a compensation servo. Wherein, the computation device is used for computing position error signal (PE signal) according to the above-described position signal, the specified pickup head position and the last compensation displacement. The filter filters the PE signal to obtain a runout error signal (RE signal). The waveform generator decides the output basic runout compensation signal (BRC signal) according to a received first control signal. The amplifier is coupled to the waveform generator and decides an amplification coefficient of the BRC signal according to a second control signal and accordingly outputs an RE signal. The phase-difference detector receives BRC signals and RE signals, compares the phase-difference between the BRC signal and the RE signal and outputs the above-mentioned first control signal based on the phase comparison result. The amplitude-difference detector receives BRC signals and RE signals, compares the amplitude-difference between the BRC signal and the RE signal and outputs the above-mentioned second control signal based on the amplitude comparison result. The controller decides and outputs a compensation signal (CS) according to the PE signal. The compensation servo decides the above-mentioned compensation displacement according to the CS and the runout compensation signal.

In short, the present invention adopts a feed-forward control mode in association with simply computing the slow-varying runout of a disk based on a phase comparison and an amplitude comparison, therefore the scheme is able to provide a disk storage system having a slow-varying rotate speed with an appropriate runout compensation just based on simple comparisons and computations.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
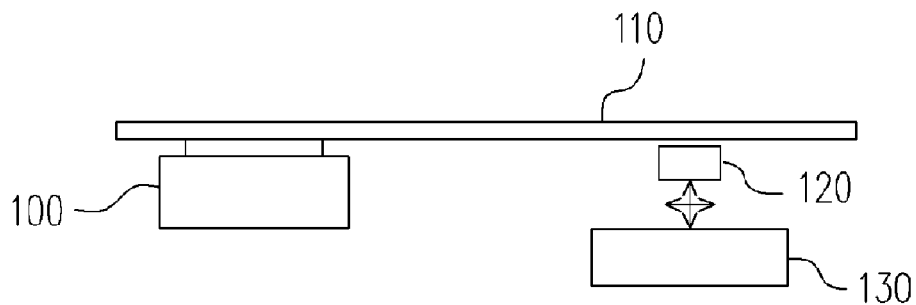
FIG. 1 is a diagram of a disk storage system.
Figure 2A:
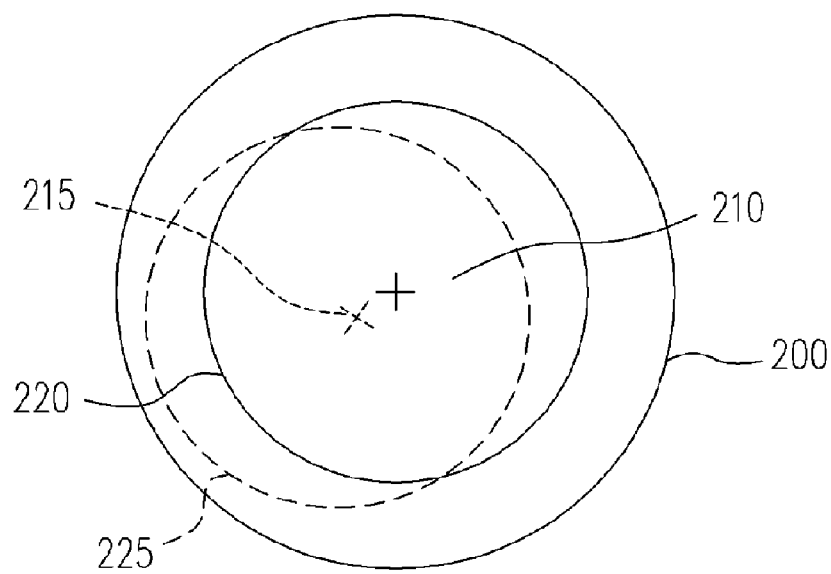
FIG. 2A is a diagram showing a runout of a disk storage system during the spin thereof.
Figure 2B:
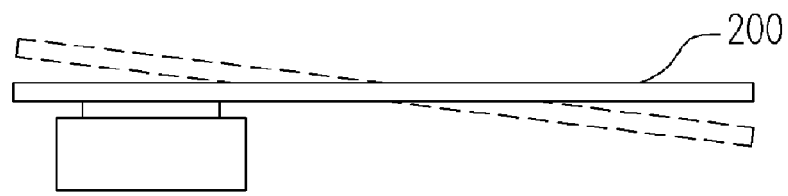
FIG. 2B is a diagram showing another runout of a disk storage system during the spin thereof.
Figure 3:
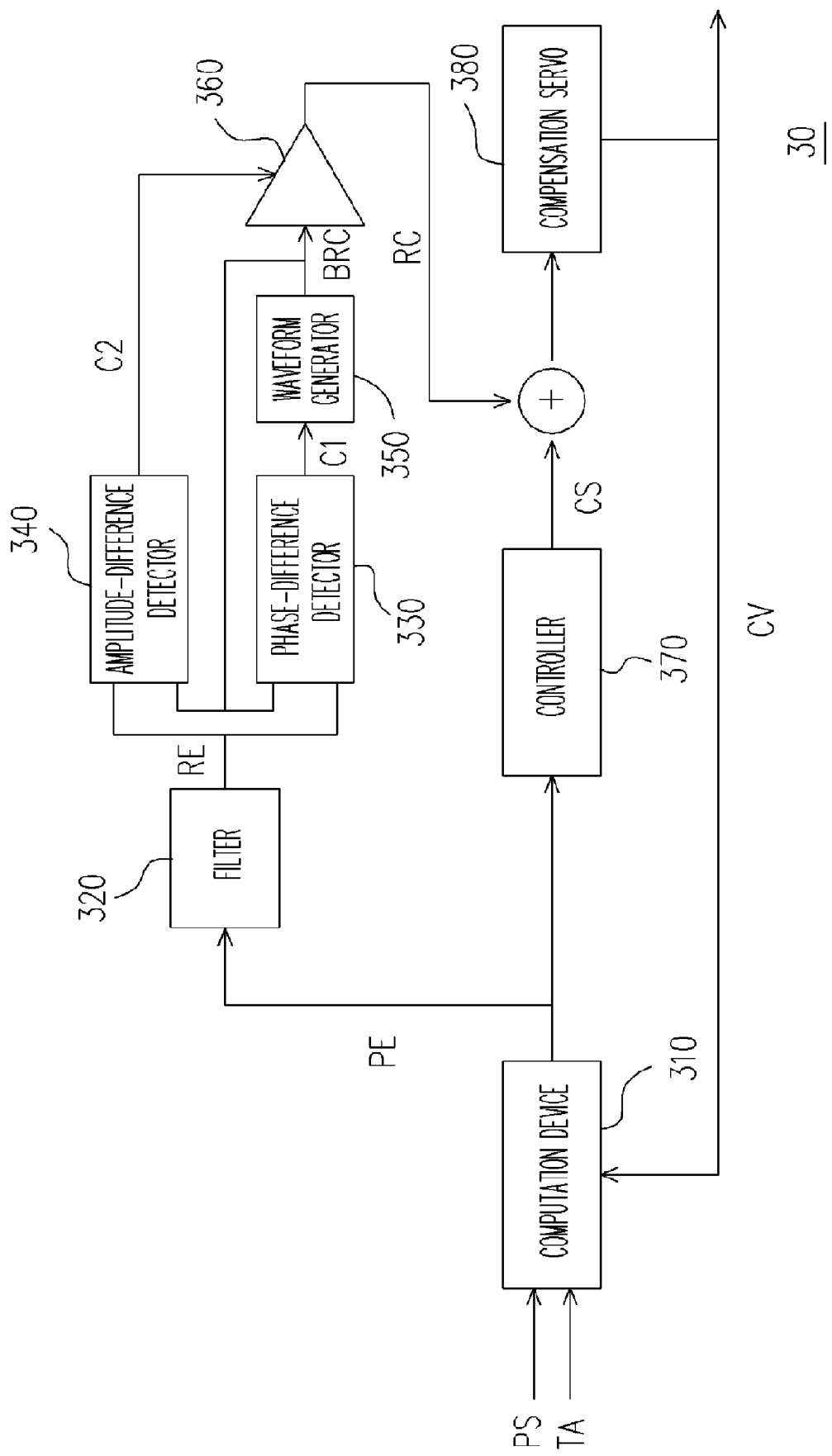
FIG. 3 is a block diagram of a circuit for compensating a slow-varying runout of a disk storage system according to an embodiment of the present invention.

Referring to FIG. 3, a block diagram of a circuit for compensating a slow-varying runout of a disk storage system according to an embodiment of the present invention is illustrated. Wherein, a circuit 30 for compensating runout errors of a disk storage system includes a computation device 310, a filter 320, a phase-difference detector 330, an amplitude-difference detector 340, a waveform generator 350, an amplifier 360, a controller 370 and a compensation servo 380. The output end of the computation device 310 is connected to the input ends of the filter 320 and the controller 370; the output end of the filter 320 is connected to an end of the phase-difference detector 330 and an end of the amplitude-difference detector 340; the output end of the phase-difference detector 330 is connected to the input end of the waveform generator 350; the output end of the waveform generator 350 is connected to another end of the phase-difference detector 330, another end of the amplitude-difference detector 340 and the input end of the amplifier 360; the output end of the amplitude-difference detector 340 is connected to the control end of the amplifier 360 to control the amplification coefficient thereof; the output signal from the controller 370 is resultant with the output signal from the amplifier 360 and the resulted signal is sent to the compensation servo 380; the compensation servo 380 decides the output thereof according to the received signal.

Prior to describing the present invention scheme, we note that the position information of a pickup head is normally available by computing the signal output from the pickup head for assuring a right position in a disk storage system. Using the position information, a normal disk storage system is able to track the position errors of the pickup head for online adjusting the pickup head position.

In the embodiment, the computation device 310 directly obtains or computes to obtains the position errors (PEs) based on the signal output from the pickup head. Note that the term of position error (PE) is usually used for a magnetic hard disk drive system. Instead, similarly to PE, a tracking error (TE) and a focus error (FE) are used for an optical disk drive system. In the description hereinafter we use the term PE instead of TE and FE for simplicity, although the present invention does not limit the application in a magnetic hard disk drive system only.

The above-described PE signal output from the computation device 310 is sent to the filter 320 and the controller 370. The controller 370, just following the conventional way, decides a compensation signal (CS signal) for output according to the PE signal, while the filter 320 conducts filtering on the PE signal and outputs the filtered signal as a runout error signal (RE signal). To produce a better filtering result, it prefers to use a band-pass filter 320, where the passing band is set at a narrow frequency range near to the runout frequency and a filtered signal is merely related to the interested runout error.

The RE signal is sent to the phase-difference detector 330 and the amplitude-difference detector 340, where a phase comparison and an amplitude comparison between the RE signal and the basic runout compensation signal (BRC signal) is conducted, respectively.

Figure 4A:
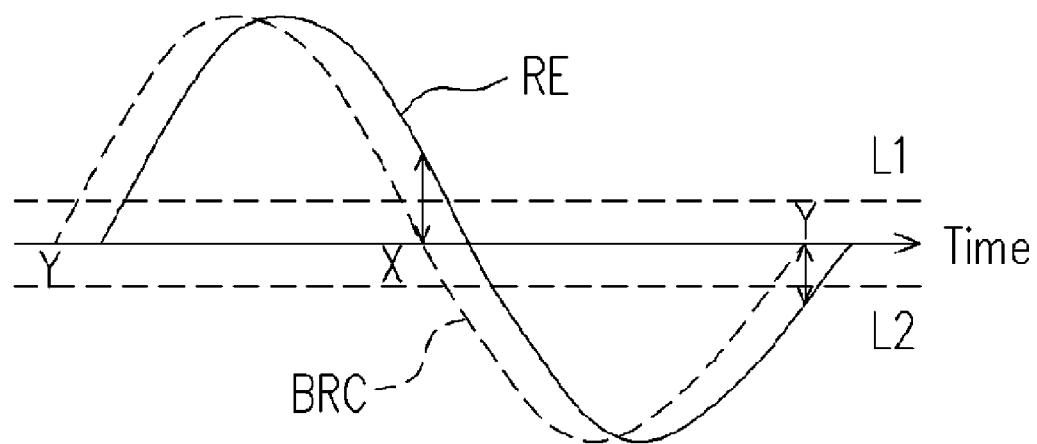
FIG. 4A is a diagram showing a runout error signal RE and a basic runout compensation signal (BRC) compared with each other by a phase-difference detector 330 in an embodiment of the present invention.

Referring to FIG. 4A, it is a diagram showing a runout error signal RE and a basic runout compensation signal (BRC) compared with each other by a phase-difference detector 330 in an embodiment of the present invention. In the embodiment, the RE signal is sampled at 0° phase or 180° phase of the BRC signal only. To prevent a false judgment caused by noise and to meet a practical need of compensation accuracy, a predetermined error tolerance range is set, as shown a range between L1 and L2 in FIG. 4A. If the sampled RE signal value corresponding to 0° phase (point X in FIG. 4A) or 180° (point Y in FIG. 4A) is beyond the predetermined error tolerance range, it means there is a significant phase-difference between the RE signal and the BRC signal and a phase adjustment is required; otherwise, if the sampled RE signal value corresponding to 0° phase or 180° phase is within the predetermined error tolerance range, it means there is no significant phase-difference between the RE signal and the BRC signal and a phase adjustment is not necessary.

Continuing to FIG. 3, once the phase-difference between the RE signal and the BRC signal is revealed, the phase-difference detector 330 outputs a corresponding control signal C1 to the waveform generator 350, which will adjust the phase of the BRC signal according to the control signal C1. The phase adjustment of the BRC signal can be reached either by modifying the frequency of the BRC signal to accelerate (for leading) and retard (for delay) the BRC signal a little bit or by forward shifting and backward shifting the BRC signal.

In the description above, to conduct a signal comparison, 0° phase or 180° phase of the BRC signal is taken as a reference point, at the time point of which the signal comparison is conducted. In fact, the chosen 0° phase or 180° phase of the BRC signal is for simplifying the comparison computation purpose only and anyone skilled in the art can choose any other point as a reference point, even use the RE signal as a reference. None of those are limited by the present invention.

Figure 4B:
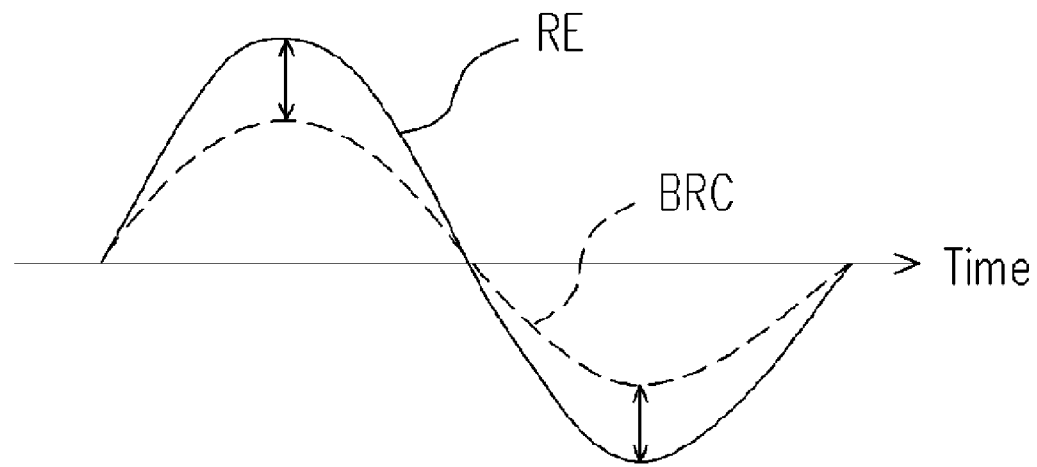
FIG. 4B is a diagram showing a runout error signal RE and a basic runout compensation signal (BRC) compared with each other by an amplitude-difference detector 340 in an embodiment of the present invention.

Now continue referring to FIG. 4B, it is a diagram showing a runout error signal RE and a basic runout compensation signal (BRC) compared with each other by an amplitude-difference detector 340 in an embodiment of the present invention. In the embodiment, the amplitude comparison can be done, either by comparing both amplitudes of the RE signal and the BRC signal corresponding to both peaks or both valleys thereof, or by comparing the sampled value of the RE signal at a time point, i.e. corresponding to a predetermined phase of the BRC signal, with a predetermined error tolerance range. As shown in FIG. 4B, at a time point corresponding to the peak (90°) or the valley (270°) of the BRC signal, the RE signal value is compared with a predetermined error tolerance range (as shown L1~L2 in FIG. 4A). If the value of the RE signal is within the predetermined error tolerance range, the amplitude of BRC signal does not need to be adjusted; otherwise, if the value of the RE signal is beyond the predetermined error tolerance range, it needs to adjust the amplitude of BRC signal for getting a near zero RE signal, wherein to properly adjust the amplitude of BRC signal, in-phase state or in-inverse-phase state between the RE signal and the BRC signal must be considered. Note that the above chosen time point corresponding to the peak (90°) or the valley (270°) of the BRC signal is not mandatory. In other words, a comparison can be conducted at two same phase points of the RE signal and the BRC signal, where two signals are sampled and the two sampled values are compared with each other, followed by magnifying the comparison result in a proportion and computing the amplitude-difference.

Referring to FIG. 3 again, after the amplitude-difference between the RE signal and the BRC signal is detected, the amplitude-difference detector 340 outputs a corresponding control signal C2 to the amplifier 360, where the amplification coefficient is adjusted according to the control signal C2. In other words, the amplitude of a runout compensation signal (RC signal) output from the amplifier 360 is decided by the control signal C2.

Afterwards, the RC signal and the CS signal are sent to the compensation servo 380. According to the two signals or a resultant signal of the two signals, a compensation displacement CV used for adjusting the pickup head is determined.

The above-described circuit provided by the embodiment hereinabove is not only one solution. The essentials of the present invention are the scheme and the steps to be performed. In the following another embodiment, several flowcharts are introduced for the purpose.

Figure 5:
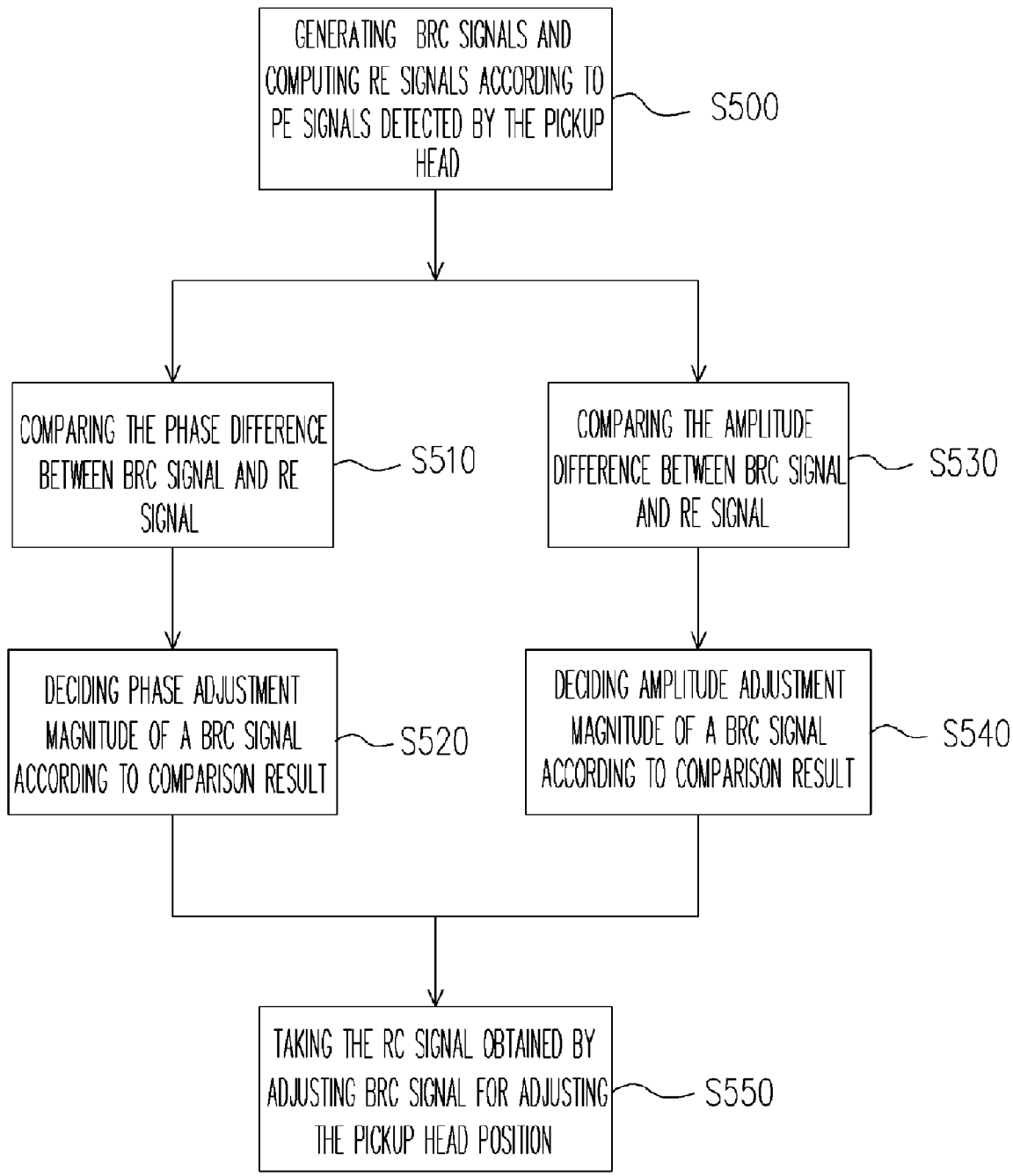
FIG. 5 is a flowchart of the method for compensating the slow-varying runout of a disk storage system according to an embodiment of the present invention.

Referring to FIG. 5, it is a flowchart of the method for compensating the slow-varying runout of a disk storage system according to an embodiment of the present invention. In the embodiment, first at step S500, a BRC signal can be generated in any way, the position signal from the pickup head is extracted by any means, including by the conventional means, and according to the extracted position signal an RE signal is computed out. Next, coming to steps S510~S520, or to steps S530~S540, or to both steps S510~S520 and S530~S540, wherein at steps S510 and S520, the phase-difference between the BRC signal and the RE signal is obtained by a phase comparison and according to the phase-difference the phase of the BRC signal is adjusted; at steps S530 and S540, the amplitude-difference between the BRC signal and the RE signal is obtained by an amplitude comparison and according to the amplitude-difference the amplitude of the BRC signal is adjusted. Finally at step S550, according to the RC signal obtained by adjusting the BRC signal, the position of the pickup head is adjusted.

Figure 6:
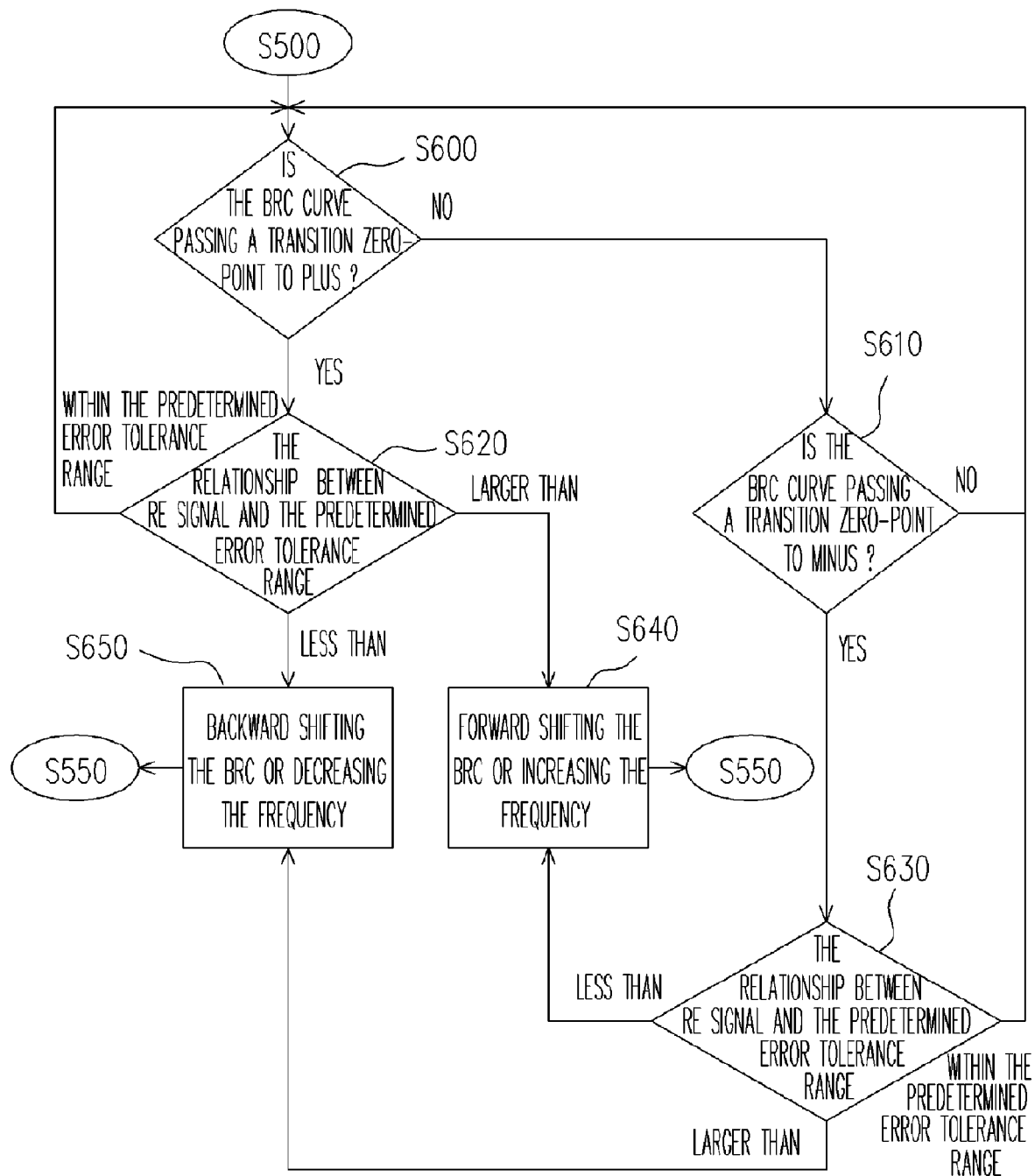
FIG. 6 is a flowchart for performing steps S510~S520 in FIG. 5 according to an embodiment of the present invention.

Referring to FIG. 6, it is a flowchart for performing the steps S510~S520 in FIG. 5 according to an embodiment of the present invention. After completing the step S500, it goes to step S600 first, where whether the BRC signal is passing a transition zero-point to a positive is decided (i.e. the point with 0° phase or the point passed by the waveform from a minus value to a plus value). If not, the flow goes to step S610 for deciding whether the BRC signal is passing a transition zero-point to a negative (i.e. the point with 180° phase or the point passed by the waveform from a plus value to a minus value). If the result is still "No", the flow goes back to step S600 again waiting for the next time point.

If the answer is "yes" at step S600, it goes to step S620 to conduct a comparison between the RE signal and a predetermined error tolerance range. If the RE signal at the point is larger than the upper limit of the predetermined error tolerance range, it means the RE signal is ahead of the BRC signal by a phase and consequently the BRC signal needs to be forward shifting or accelerated by increasing the frequency that is the step S640 case. Otherwise, if the RE signal at the point is less than the lower limit of the predetermined error tolerance range, it means the RE signal is delayed with respect to the BRC signal by a phase and consequently the BRC signal needs to be backward shifting or retarded by decreasing the frequency that is the step S650 case. Further, if the RE signal at the point is within the predetermined error tolerance range, it means a noise interference or the variation of the runout error can be neglected and no need to adjust phase of the BRC signal, and the flow goes back to step S600 waiting for the next time point.

Furthermore, if "yes" is determined at step S610, the flow goes to step S630 to conduct a comparison between the RE signal and a predetermined error tolerance range. If the RE signal at the point is less than the lower limit of the predetermined error tolerance range, it means the RE signal is ahead of the BRC signal by a phase and consequently the BRC signal needs to be forward shifting or accelerated by increasing the frequency that is the step S640 case. Otherwise, if the RE signal at the point is larger than the upper limit of the predetermined error tolerance range, it means the RE signal is delayed with respect to the BRC signal by a phase and consequently the BRC signal needs to be backward shifting or retarded by decreasing the frequency that is the step S650 case. Similarly, if the RE signal at the point is within the predetermined error tolerance range, it means a noise interference or the variation of the runout error can be neglected and no need to adjust phase of the BRC signal, and the flow goes back to step S600 waiting for the next time point.

Figure 7:
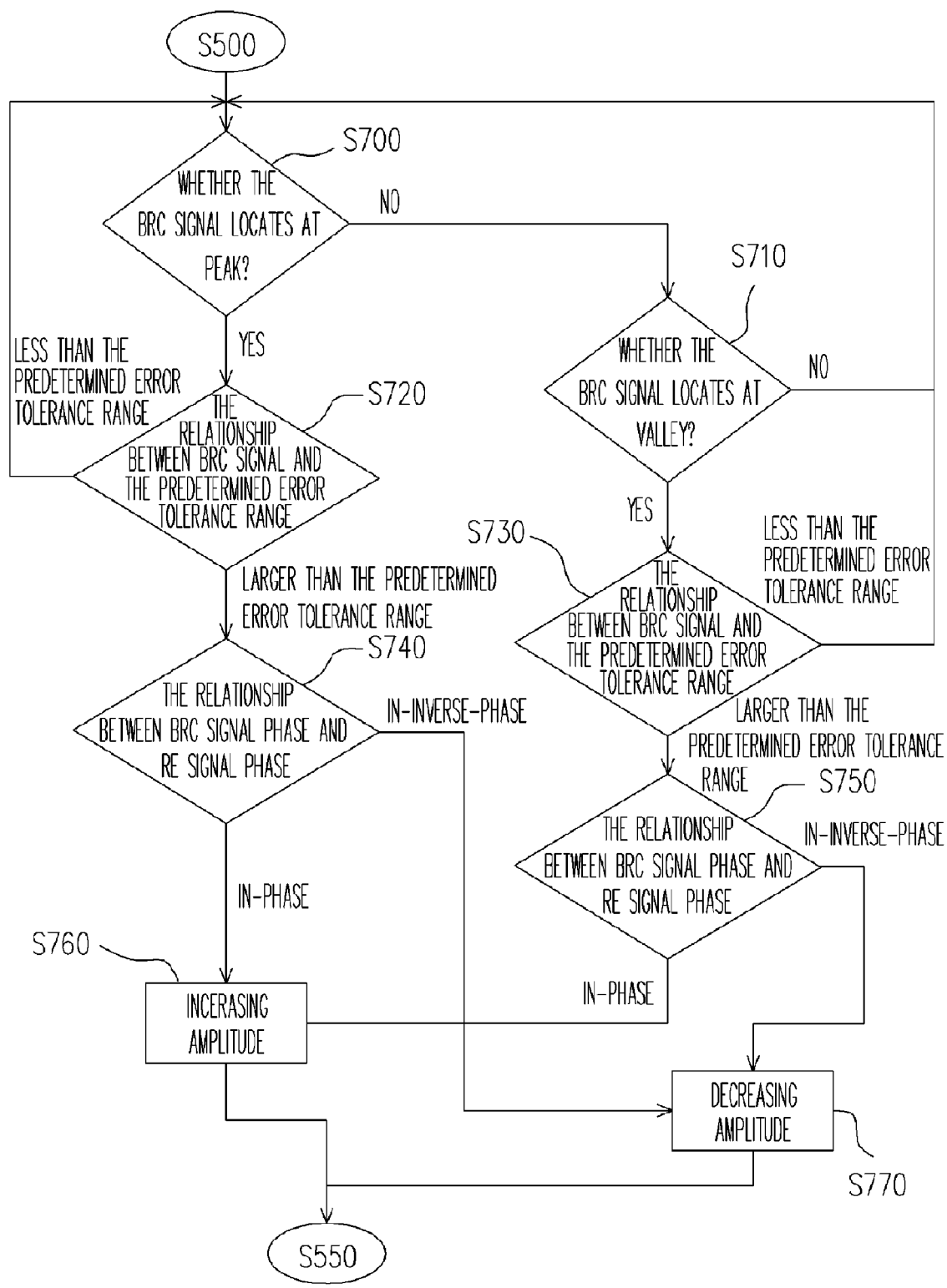
FIG. 7 is a flowchart for performing steps S530~S540 in FIG. 5 according to an embodiment of the present invention.

Referring to FIG. 7, it is a flowchart for performing the steps S530~S540 in FIG. 5 according to an embodiment of the present invention. Wherein, prior to conducting a comparison between the BRC signal and the RE signal, any phase-difference factor has been removed already for simplifying illustration. In fact, the adjustment of phase/frequency and the adjustment of amplitude in practice can be conducted simultaneously. In the embodiment after finishing the step S500, it goes to step S700 first, where whether the BRC signal locates at a peak is decided. If not, the flow goes to step S710 for deciding whether the BRC signal locates at a valley. If the answer is still "No", the flow goes back to step S700 again waiting for the next time point.

If "yes" is determined at step S700, it goes to step S720 to conduct a comparison between the RE signal and a predetermined error tolerance range. If the RE signal at the point is larger than the upper limit of the predetermined error tolerance range (at step S720) and the RE signal is in-phase of the BRC signal (step S740), it means the compensation amount is not sufficient and the amplitude of the BRC signal needs to be increased (step S760). Otherwise, if the RE signal at the point is larger than the upper limit of the predetermined error tolerance range (at step S720) but the RE signal is in-inverse-phase of the BRC signal (step S740), it means the compensation amount is excessive and the amplitude of the BRC signal needs to be decreased (step S770). Further, if the RE signal at the point is within the predetermined error tolerance range, it means a noise interference or the variation of the runout error can be neglected and no need to adjust phase of the BRC signal, and the flow goes back to step S700 waiting for the next time point.

Furthermore, if "yes" is determined at step S710, the flow goes to step S730 to conduct a comparison between the RE signal and a predetermined error tolerance range. If the RE signal at the point is larger than the upper limit of the predetermined error tolerance range (step S730) and the RE signal is in-phase of the BRC signal (step S750), it means the compensation amount is not sufficient and the amplitude of the BRC signal needs to be increased (step S760). Otherwise, if the RE signal at the point is larger than the upper limit of the predetermined error tolerance range (at step S730) but the RE signal is in-inverse-phase of the BRC signal (step S750), it means the compensation amount is excessive and the amplitude of the BRC signal needs to be decreased (step S770). Similarly, if the RE signal at the point is within the predetermined error tolerance range, it means a noise interference or the variation of the runout error can be neglected and no need to adjust phase of the BRC signal, and the flow goes back to step S700 waiting for the next time point.

In short, the present invention adopts a feed-forward control mode in association with simply computing the slow-varying runout of a disk based on a phase comparison and an amplitude comparison, therefore the scheme is able to provide a disk storage system having a slow-varying rotate speed with an appropriate runout compensation just based on simple comparisons and computations.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A method for compensating a slow-varying runout of a disk storage system, suitable for a disk storage system employing a disk as information storage medium, wherein the disk storage system reads data from the disk or writes data into the disk by means of a pickup head and the pickup head is able to output a position signal (PS), comprising:
   generating a basic runout compensation signal (BRC signal);
   according to the PS generating a runout error signal (RE signal);
   comparing the RE signal with the BRC signal for adjusting the runout compensation signal (RC signal), wherein it comprises:
      comparing the phase of the BRC signal with the phase of the RE signal and according to the compared phase-difference deciding the extent of adjusting the BRC signal phase; and
      comparing the amplitude of the BRC signal with the amplitude of the RE signal and according to the compared amplitude-difference deciding the extent of adjusting the BRC signal amplitude; and
   using an RC signal obtained by adjusting the BRC signal for further adjusting the pickup head.

2. The method for compensating a slow-varying runout of a disk storage system as recited in claim 1, wherein comparing the phase-difference between the BRC signal and the RE signal comprises:
   at a time point corresponding to a predetermined phase of the BRC signal, conducting a comparison between the RE signal and a predetermined error tolerance range (PETR).

3. The method for compensating a slow-varying runout of a disk storage system as recited in claim 2, wherein the predetermined phase is at least one of 0° and 180°.

4. The method for compensating a slow-varying runout of a disk storage system as recited in claim 2, wherein if the RE signal is within the PETR, there is no need to adjust the BRC signal phase; while if the RE signal is beyond the PETR, the BRC signal phase needs to be adjusted.

5. The method for compensating a slow-varying runout of a disk storage system as recited in claim 2, wherein the BRC signal phase is adjusted by changing the frequency of the BRC signal.

6. The method for compensating a slow-varying runout of a disk storage system as recited in claim 2, wherein the BRC signal phase is adjusted by forward shifting or backward shifting the BRC signal.

7. The method for compensating a slow-varying runout of a disk storage system as recited in claim 1, wherein comparing the amplitude-difference between the BRC signal and the RE signal comprises:

at a time point corresponding to a predetermined phase of the BRC signal, conducting a comparison between the RE signal and a predetermined error tolerance range (PETR), if the RE signal is within the PETR, the BRC signal amplitude is not adjusted, if the RE signal is beyond the PETR, according to an in-phase or an in-inverse-phase state between the RE signal and the BRC signal, the BRC signal amplitude is adjusted to make the RE signal to be near zero.

8. The method for compensating a slow-varying runout of a disk storage system as recited in claim 7, wherein the predetermined phase is at least one of 90° and 270°.

9. A circuit for compensating a slow-varying runout of a disk storage system, suitable for a disk storage system employing a disk as information storage medium, wherein the disk storage system reads data from the disk or writes data into the disk by means of a pickup head and the pickup head is able to output a position signal (PS), comprising:

a computation device, used for computing a position error signal (PE signal) according to the PS, the specified pickup head position and a compensation displacement;

a filter, used for filtering the PE signal to obtain a runout error signal (RE signal);

a waveform generator, used for deciding a basic runout compensation signal (BRC signal) for output according to a received first control signal;

an amplifier, coupled to the waveform generator and used for deciding an amplification coefficient of the BRC signal according to a received second control signal and for outputting a runout compensation signal (RC signal);

a phase-difference detector, coupled to the waveform generator and the filter to receive the BRC signal and the RE signal and used for comparing the phase-difference between the BRC signal and the RE signal and for deciding the first control signal for output according to the comparison result;

an amplitude-difference detector, coupled to the waveform generator and the filter to receive the BRC signal and the RE signal and used for comparing the phase-difference between the BRC signal and the RE signal to identify whether the BRC signal is in-phase of the RE signal or in-inverse-phase of the RE signal and for deciding the second control signal for output according to the comparison result;

a controller, used for deciding a compensation signal (CS) for output according to the PE signal; and a compensation servo, used for deciding a compensation displacement of the pickup head according to the CS and the RC signal.

10. The circuit for compensating a slow-varying runout of a disk storage system as recited in claim 9, wherein the filter is a band-pass filter.

11. A method for compensating a slow-varying runout of a disk storage system, suitable for a disk storage system employing a disk as information storage medium, wherein the disk storage system reads data from the disk or writes data into the disk by means of a pickup head and the pickup head is able to output a position signal (PS), comprising:

generating a basic runout compensation signal (BRC signal);

according to the PS generating a runout error signal (RE signal);

comparing phase-difference between the BRC signal and the RE signal for deciding whether the BRC signal phase needs to be adjusted according to the comparison result; and using a runout compensation signal (RC signal) obtained by adjusting the BRC signal for further adjusting the pickup head.

12. The method for compensating a slow-varying runout of a disk storage system as recited in claim 11, wherein comparing the phase-difference between the BRC signal and the RE signal comprises:

at a time point corresponding to a predetermined phase of the BRC signal, conducting a comparison between the RE signal and a predetermined error tolerance range (PETR).

13. The method for compensating a slow-varying runout of a disk storage system as recited in claim 12, wherein the predetermined phase is at least one of 0° and 180°.

14. The method for compensating a slow-varying runout of a disk storage system as recited in claim 12, wherein if the RE signal is within the PETR, there is no need to adjust the BRC signal phase; while if the RE signal is beyond the PETR, the BRC signal phase needs to be adjusted.

15. The method for compensating a slow-varying runout of a disk storage system as recited in claim 12, wherein the BRC signal phase is adjusted by changing the frequency of the BRC signal.

16. The method for compensating a slow-varying runout of a disk storage system as recited in claim 12, wherein the BRC signal phase is adjusted by forward shifting or backward shifting the BRC signal.

17. A method for compensating a slow-varying runout of a disk storage system, suitable for a disk storage system employing a disk as information storage medium, wherein the disk storage system reads data from the disk or writes data into the disk by means of a pickup head and the pickup head is able to output a position signal (PS), comprising:

generating a basic runout compensation signal (BRC signal);

according to the PS generating a runout error signal (RE signal);

comparing the BRC signal with the RE signal for deciding whether the BRC signal is in-phase or in-inverse-phase of the RE signal and for deciding whether the BRC amplitude needs to be adjusted according to the comparison result; and using a runout compensation signal (RC signal) after adjusting the BRC signal for further adjusting the pickup head position.

18. The method for compensating a slow-varying runout of a disk storage system as recited in claim 17, wherein at a time point corresponding to a predetermined phase of the BRC signal, if the RE signal is within the PETR, there is no need to adjust the BRC signal amplitude; if the RE signal at the time point is beyond the PETR, the BRC signal amplitude needs to be adjusted.

19. The method for compensating a slow-varying runout of a disk storage system as recited in claim 18, wherein the predetermined phase is at least one of 90° and 270°.

* * * * *